3,342,841
PRODUCTION OF SEBACIC ACID AND ω-HYDROXYPELARGONIC ACID FROM TRIALUMINO DIOCTANE
Walter K. Henle, Orinda, Calif., assignor to Shell Oil Company, New York, N.Y., a corporation of Delaware
No Drawing. Filed Dec. 30, 1964, Ser. No. 422,411
5 Claims. (Cl. 260—413)

ABSTRACT OF THE DISCLOSURE

A mixture of carboxylic acids containing major amounts of sebacic and/or ω-hydroxypelargonic acid is obtained by carboxylation of a polymeric aluminum alkyl (dialumino trioctane) followed by optional oxidation of the remaining carbon-aluminum bonds and then hydrolysis to produce the acid mixture.

---

This invention relates to an improved process for the production of certain carboxylic acids. More particularly it relates to an improved process for the production of certain higher alkyl carboxylic acids.

Mono- and di-carboxylic acids as well as related hydroxycarboxylic acids have gained wide usage in industry where, for example, they are employed in the production of esters, amides or anhydrides, or in the production of polymeric materials such as polyesters or polyamides. General methods are available for the production of carboxylic acids of low molecular weight, as by oxidation of the corresponding aldehydes or alcohols, and additionally such low molecular weight acids are frequently isolable from natural products. Alkanoic acids of comparatively high molecular weight, e.g., $C_{12}$ or higher, are typically obtained from hydrolysis of naturally occurring fats and oils. Greater difficulty is attendant to the production of carboxylic acids of intermediate molecular weight, particularly when it is desired that the carboxylic acid possess an additional reactive substituent.

It is therefore an object of the present invention to provide an improved process for the production of certain carboxylic acids. A more particular object is to provide an improved process for the production of certain straight-chain $C_9$-alkanoic acids which possess an additional substituent in the omega position relative to the carboxy group.

It has now been found that these objects are accomplished by carboxylation of certain polymeric aluminum alkyls followed by optional oxidation and subsequently hydrolysis to produce the desired acidic products. The product mixture contains varying proportions of sebacic acid and/or ω-hydroxypelargonic acid, depending upon the particular reaction procedure employed.

Broadly speaking, the present invention contemplates the production of a mixture containing one or more carboxylic acids represented by the formula $$X\text{-}(CH_2)_8\text{---}CO_2H$$

wherein X is hydroxy or carboxy. These materials are sebacic acid when X is carboxy, or ω-hydroxypelargonic acid when X is hydroxy. As will be discussed below, the process of the invention results in a mixture of acidic materials, along with amounts of monocarboxylic acid, glycol and hydrocarbon. Although it is not possible to produce only a single acidic product, by varying the reaction conditions it is possible to vary the composition of the product mixture, thereby enabling the production of a mixture enriched in either desired product.

In the process of the invention, the initial reaction step comprises the carboxylation of a polymeric aluminum alkyl. Although other polymeric aluminum alkyls are similarly operable, to obtain the ω-substituted $C_9$-carboxylic acids of the invention, it is necessary to employ a polymeric aluminum alkyl wherein all alkyl moieties are $\alpha,\omega$-divalent straight-chain $C_8$-moieties. Although, as in the case of any highly cross-linked polymeric material, the polymeric aluminum alkyl is not completely described by a single structure, it is considered that the aluminum reactant may be represented by the formula

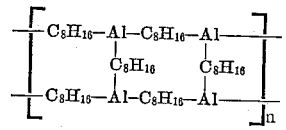

wherein $n$ is a very large number. Although it is further apparent that this polymeric material is not completely described by a simple chemical name, the above polymeric structure is herein referred to as dialumino trioctane, thereby indicating the composition ratio of two aluminum atoms for each three octane moieties.

The dialumino trioctane is conveniently prepared by reacting 1,7-octadiene with a trialkyl aluminum or a dialkyl aluminum hydride, wherein the alkyls are lower alkyl, e.g., having up to 4 carbon atoms, at an elevated temperature. The reaction may be conducted in the presence of solvent, but preferably is conducted by merely mixing the reactants and heating the mixture until reaction is complete. During reaction, the former lower alkyl substituents on the reactant trialkyl aluminum or dialkyl aluminum hydride are apparently replaced by the octadiene and the former lower alkyl substituents are observed as the corresponding olefin. For example, reaction of 1,7-octadiene with triisobutyl aluminum or diisobutyl aluminum hydride results in the production of dialumino trioctane and isobutylene. The polymeric dialumino trioctane is a hard, brittle glassy solid at room temperature which becomes viscous when heated above about 60° C.

The dialumino trioctane is carboxylated by contact with carbon dioxide. Without wishing to be bound by any specific theory, it appears probable that carboxylation is effected through the insertion of a molecule of carbon dioxide into a carbon-aluminum bond of the dialumino trioctane. In general, the carboxylation procedure follows the consideration that each subsequent carboxylation of carbon-aluminum bonds of any given aluminum atom is more difficult than the preceding carboxylation. Thus, the carboxylation of a single carbon-aluminum bond of the aluminum atoms present in the polymer, i.e., the introduction of one mole of carbon dioxide for each mole of aluminum present, is comparatively easily accomplished. The carboxylation of the second carbon-aluminum bond, i.e., the introduction of a second mole of carbon dioxide per mole of aluminum, is more difficult, and methods for carboxylating the remaining carbon-aluminum bond of each aluminum atom present are not presently known. Because of this difference in activity toward carboxylation, it is posible to effect essentially only a monocarboxylation, that is, the carboxylation of only an average of one carbon-aluminum bond of the individual aluminum atoms. Alternatively, by increasing the severity of the reaction conditions, the efficient carboxylation of the second carbon-aluminum bond may be effected.

Alternate methods are available for conducting the carboxylation reaction. Exposure of the solid dialumino trioctane to an atmosphere of carbon dioxide, preferably under superatmospheric pressure, results in carboxylation to some extent. Alternatively, the dialumino trioctane is heated to a temperature at which it becomes viscous and carbon dioxide is passed through under pressure to effect reaction. Because of the heterogeneous character of the reaction, preferred methods of conducted carboxylation are those wherein fresh surface of the polymeric aluminum compound is continuously exposed to contact with carbon dioxide. As when the polymeric aluminum compound is in a solid state reaction takes place most rapidly on the surface of the solid, some mechanical provision is desirably made for continuous exposure of new or clean surface so that reaction continues at a suitable rate. Suitable mechanical processing for exposure of fresh surface include grinding, slicing, rubbing, pulverizing, powdering and the like, herein termed processes of attrition. Such attrition is conveniently effected by conducting the carboxylation in a commercial attrition reactor or a vibratory ball mill.

Carboxylation is effected by contacting the polymeric aluminum compound with carbon dioxide which is in the liquid or gaseous state. To effect the initial carboxylation, the dialumino trioctane is contacted with at least a molar excess, based on the aluminum, of carbon dioxide at temperatures below about 140° C. The temperature range from about 0° C. to about 100° C. is preferred for the initial carboxylation and frequently it is convenient to employ ambient temperature. The dependency on carbon dioxide pressure will largely be determined by the physical state of the carbon dioxide and the state of particle size of the dialumino trioctane. In general, reaction pressures from about 0.5 atmosphere to about 75 atmospheres are suitable. Particularly convenient are pressures generated by the use of liquid carbon dioxide in a sealed reaction vessel. Such pressures are from about 40 atmospheres to about 60 atmospheres. In the carboxylation process, it is preferred that anhydrous conditions be employed.

Subsequent to reaction with one mole of carbon dioxide per mole of aluminum present in the polymeric material, determined, for example, by following the reactor pressure decrease, the reaction may be terminated and the mono-carboxylated product recovered as a solid at ambient temperature. It should be appreciated that although an average of one carbon-aluminum bond of each aluminum atom present has been carboxylated, the carboxylation is not selective with regard to the octane moieties and within the monocarboxylated aluminum-containing polymer there is a statistically predictable mixture of octane moieties having both terminal carbon-aluminum bonds carboxylated, octane moieties wherein one terminal carbon-aluminum has been carboxylated and octane moieties wherein neither terminal carbon-aluminum bond has been carboxylated.

In an alternate modification of the process of the invention, the carboxylation of a second carbon-aluminum bond per atom of aluminum present in the aluminum-containing polymer is effected by continued contact with carbon dioxide. If the carboxylation of a second bond is desired, the isolated mono-carboxylated compound may be again contacted with a molar excess of carbon dioxide, although it is most convenient to conduct the second carboxylation without prior separation of the mono-carboxylated aluminum-containing polymer. As previously stated, somewhat more vigorous reaction conditions are required to effect the second carboxylation, particularly with regard to the reaction temperature. Reaction temperatures above about 150° C. are required to obtain secondary carboxylation at a desirable rate although the temperature should be no higher than about 220° C. Preferred are reaction temperatures from about 170° C. to about 210° C. The secondary carboxylation is performed at pressures that are atmospheric or above and pressures from about 1 atmosphere to about 80 atmospheres are suitable; pressures from about 35 atmospheres to about 60 atmospheres are preferred. As the mono-carboxylated polymeric material is a solid at reaction temperature, continued attrition during the secondary carboxylation is desirable to obtain an optimum reaction rate. Subsequent to the reaction, di-carboxylated product is recovered as a solid from the reactor. The di-carboxylated product also contains a statistical distribution of carboxy moieties, containing di-carboxylated octane moieties, mono-carboxylated octane moieties and a minor amount of non-carboxylated octane moieties, with an over-all average of two of the carbon-aluminum bonds of each aluminum atom present in the polymer having been carboxylated.

As an optional second step in the process of the invention, the carboxylated aluminum-containing polymer, either mono-carboxylated or di-carboxylated, is reacted with molecular oxygen to oxidize the remaining carbon-aluminum bonds in the polymeric material. As either carboxylated product is solid at reaction temperature, it is preferred to contact the carboxylated product with oxygen under conditions whereby fresh surface is continuously exposed to contact with the oxygen, e.g., attrition. The oxidation is conducted by contacting the carboxylated product with a molar excess of oxygen at temperatures below about 165° C. and temperatures from about 20° C. to about 150° C. are satisfactory. The oxidation process is exothermic in character and, if necessary, cooling means are provided to maintain the temperature at a desired level. The reaction pressure is suitably atmospheric or higher. A certain danger is attendant to oxidation processes at high oxygen pressure, so that it is preferred to employ comparatively low reaction pressures, e.g., from about 1 atmosphere to about 6 atmospheres.

The source of oxygen employed in the oxidation and the rate at which the carboxylated polymer is contacted is not critical, so long as the temperature remains at a suitable level. It is often convenient, in order to facilitate control of the reaction temperature, to initially contact the carboxylated polymer with a dilute mixture of oxygen in other inert gas, e.g., nitrogen, argon, helium or the like, and gradually increase the oxygen content of the mixture during the course of the reaction. In an alternate method of effecting oxidation, the dilute oxygen-inert gas mixture is used throughout the oxidation process. One suitable and particularly convenient gas is air. In any event, the gas employed should be anhydrous as the presence of moisture during oxidation is not desirable.

Whether or not the carboxylated product has been oxidized, the aluminum-containing polymeric product is converted to the desired carboxylic acid mixture by conventional hydrolysis methods. Hydrolysis is typically effected by contacting the polymeric product with an aqueous solution of a strong acid. Illustrative strong acids include carboxylic acids such as trichloroacetic acid and dichloroacetic acid; sulfonic acids such as methanesulfonic acid, benzenesulfonic acid and p-toluenesulfonic acid; as well as resinous materials known as acidic cation exchange resins. Preferred acids, however, largely for economic reasons, are strong mineral acids such as hydrochloric acid, sulfuric acid, phosphoric acid, nitric acid and the like. The concentration of acid in the aqueous hydrolysis medium is not material and any convenient concentration is suitable. Typical concentrations of aqueous acid are from about 3 N to about 6 N. The hydrolysis is conducted at any convenient temperature and pressure, so long as the reactants are maintained primarily in a non-gaseous phase. Hydrolysis temperatures from about 30° to about 120° C. are satisfactory, as are reaction pressures from about 0.5 atmosphere to about 5 atmospheres. Generally satisfactory results are obtained by maintaining the hydrolysis mixture at reflux temperature and at or about atmospheric pressure.

Subsequent to hydrolysis, the product mixture is separated and the carboxylic acid product is recovered by conventional methods, e.g., selective extraction, fractional distillation, crystallization or chromatographic methods.

The composition of the carboxylic acid product will depend upon the particular process steps employed. In general, carboxylation procedures result in the introduction of a $CO_2$ moiety which, upon hydrolysis, is observed as a carboxy group. Thus, the more extension the carboxylation has been, the more extensive the formation of carboxy groups will be. When the optional oxidation of the carboxylated product is employed, the remaining carbon-aluminum bonds are oxidized and, upon hydrolysis, hydroxy groups are observed. The carbon-aluminum bonds, if any, that are neither carboxylated nor oxidized, upon hydrolysis are converted to hydrocarbon moieties. Thus, dicarboxylation, oxidation and hydrolysis of the dialumino trioctane results in the production of a mixture of sebacic acid and ω-hydroxypelargonic acid with a lesser amount of 1,8-octanediol also present. Should the oxidation step not be employed, the observed mono-carboxylic product is pelargonic acid and the non-carboxylic acid product is n-octane. Alternatively, if the carboxylation is terminated at the end of monocarboxylation, oxidation and hydrolysis results in the production of a product mixture containing a lesser proportion of sebacic acid, but a greater proportion of ω-hydroxypelargonic acid, as well as a greater proportion of 1,8-octanediol. Should monocarboxylation be employed without subsequent oxidation, hydrolysis would afford a mixture containing sebacic acid and pelargonic acid as the acidic components, the mono-carboxylic acid being the major product. It is therefore apparent that although a mixture of acidic materials is invariably formed, the composition of the product mixture may be controllably varied to produce a mixture comparatively rich in a desired component.

To further illustrate the improved process of the invention, the following examples are provided. It should be understood that the details thereof are not to be regarded as limitations as they may be varied as will be understood by one skilled in this art.

*Example I*

To a steel reactor equipped with a stirrer and a vent to release gaseous products was charged 0.41 mole of diisobutyl aluminum hydride and 0.6 mole of 1,7-octadiene. The mixture was maintained at atmospheric pressure and in the absence of moisture and oxygen, and was stirred at 130° C. for 10 hours, during which time 0.8 mole of isobutylene was liberated. The product, dialumino trioctane is a clear, colorless resinous material which is viscous above about 60° C. but becomes hard, brittle and glassy at room temperature and is easily powdered.

When the production of dialumino trioctane was repeated using 0.41 mole of triisobutyl aluminum in place of the diisobutyl aluminium hydride, 1.2 moles of isobutylene were liberated during reaction and a similar polymeric material was obtained.

*Example II*

In a steel reactor equipped with a magnetic stirrer and a vent to release gaseous reaction products, 0.41 mole of triisobutyl aluminum and 0.6 mole of 1,7-octadiene were reacted in 250 ml. of xylene at 130° C., during which time 1.1 moles of isobutylene were liberated. The volatile products were removed from the product mixture by vacuum distillation to afford dialumino trioctane, a viscous material which hardened to a glassy resin when cooled to room temperature.

*Example III*

In a commercial reactor containing steel balls serving as a means for promoting attrition, 39 g. (0.1 mole) of dialumino trioctane was treated at atmospheric pressure and ambient temperature with a mixture of 5% oxygen and 95% nitrogen. During the reaction period of 1 hour, the percentage of oxygen present in the gaseous mixture was increased from 5%, eventually reaching 100%. The dialumino trioctane was continuously attrited during the oxidation.

The oxidized product was hydrolyzed by heating with 3 N aqueous hydrochloric acid for 0.5 hour at 100° C., and the hydrolysis product mixture was extracted with ether and dried. Distillation of solvent afforded a product mixture which was shown by gas-liquid chromatographic analysis to consist principally of 40 g. of 1,8-octanediol.

The product mixture contained less than 5% octanol and only traces of n-octane.

*Example IV*

In an autoclave, 39 g. of dialumino trioctane prepared according to the procedure of Example I was reacted under continuous attrition with carbon dioxide at room temperature at a carbon dioxide pressure of approximately 600 lbs. After 1 hour the temperature was raised to 210° C. and the attrition was continued until two moles of carbon dioxide for each mole of aluminum present had been consumed as measured by the pressure drop within the reactor. The reactor was then cooled and opened and the carboxylation product mixture was hydrolyzed by reaction with aqueous 3 N aqueous hydrochloric acid at 100° C. for 0.5 hour. The hydrolysis product mixture was extacted with ether and the combined extract was dried over anhydrous sodium sulfate. Removal of the ether solvent afforded a mixture which was analyzed by gas-liquid chromatography and found to contain 45% mole of sebacic acid, an equivalent amount of pelargonic acid and 10% mole n-octane.

*Example V*

The procedure of Example IV was followed to carboxylate 39 g. of dialumino trioctane. Subsequent to the consumption of two moles of carbon dioxide, the aluminum-containing product was contacted, under continuous attrition, with dry air and then with a mixture of nitrogen and oxygen the oxygen content of which was gradually increased, as in the procedure of Example III. The product mixture was then hydrolyzed, extracted and dried according to the procedure of the previous examples. The hydrolysis product mixture was found to contain approximately 43% sebacic acid, an equal amount of ω-hydroxypelargonic acid, approximately 10% 1,8-octanediol, less than 4% pelargonic acid and no observable amount of n-octane.

I claim as my invention:

1. The process for the production of as a principal product at least one compound of the formula

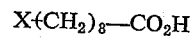

X—(CH$_2$)$_8$—CO$_2$H wherein X is selected from the group consisting of carboxy and hydroxy which comprises
    (a) intimately contacting dialumino trioctane with carbon dioxide at a temperature below about 140° C. and at a pressure from about 0.5 atmosphere to about 75 atmospheres, thereby forming a mono-carboxylated dialumino trioctane product of an average of one carbon dioxide molecule for each aluminum atom;
    (b) intimately contacting said mono-carboxylated dialumino trioctane product with carbon dioxide at a temperature from about 150° C. to about 220° C. and a pressure from about 1 atmosphere to about 80 atmospheres, thereby forming a di-carboxylated dialumino trioctane product of an average of two carbon dioxide molecules for each aluminum atom;
    (c) intimately contacting said di-carboxylated dialumino trioctane product with molecular oxygen at a temperature below about 165° C.; and
    (d) hydrolyzing the resulting product by contacting with aqueous strong mineral acid.

2. The process for the production of as a principal product at least one compound of the formula

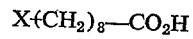

X—(CH$_2$)$_8$—CO$_2$H wherein X is selected from the group consisting of carboxy and hydroxy which comprises
    (a) intimately contacting dialumino trioctane with carbon dioxide at a temperature from about 0° C. to about 100° C. and a pressure from about 0.5 atmosphere to about 75 atmospheres, thereby forming a monocarboxylated dialumino trioctane product of an average of one carbon dioxide molecule for each aluminum atom;
(b) intimately contacting said mono-carboxylated dialumino trioctane product with molecular oxygen at a temperature from about 20° C. to about 150° C.; and
(c) hydrolyzing the resulting product by contact with aqueous strong mineral acid at a temperature from about 30° C. to about 120° C.

3. The process for the production of as a principal product at least one compound of the formula $$X{-}(CH_2)_8{-}CO_2H$$

wherein X is selected from the group consisting of carboxy and hydroxy which comprises
(a) intimately contacting dialumino trioctane with carbon dioxide at a temperature from about 0° C. to about 100° C. and a pressure from about 0.5 atmosphere to about 75 atmospheres, thereby forming a mono-carboxylated dialumino trioctane product of an average of one carbon dioxide molecule for each aluminum atom;
(b) intimately contacting said mono-carboxylated dialumino trioctane product with carbon dioxide at a temperature from about 150° C. to about 220° C. and a pressure from about 1 atmosphere to about 80 atmospheres, thereby forming a di-carboxylated dialumino trioctane product of an average of two carbon dioxide molecules for each aluminum atom; and
(c) hydrolyzing said di-carboxylated dialumino trioctane product by contact with aqueous strong mineral acid at a temperature from about 30° C. to about 120° C.

4. The process for the production of as a principal product at least one compound of the formula $$X{-}(CH_2)_8{-}CO_2H$$

wherein X is selected from the group consisting of carboxy and hydroxy which comprises
(a) intimately contacting dialumino trioctane with carbon dioxide at a temperature from about 0° C. to about 100° C. and a pressure from about 0.5 atmosphere to about 75 atmospheres, thereby forming a mono-carboxylated dialumino trioctane product of an average of one carbon dioxide molecule for each aluminum atom;
(b) hydrolyzing said mono-carboxylated dialumino trioctane product by contact with aqueous strong mineral acid at a temperature from about 30° C. to about 120° C.

5. The process for the production of as a principal product at least one compound of the formula $$X{-}(CH_2)_8{-}CO_2H$$

wherein X is selected from the group consisting of carboxy and hydroxy which comprises
(a) intimately contacting dialumino trioctane with a molar excess, based on aluminum, of carbon dioxide at a temperature from about 0° C. to about 100° C. and at a pressure from about 0.5 atmosphere to about 75 atmospheres, thereby forming a mono-carboxylated dialumino trioctane product of an average of one carbon dioxide molecule for each aluminum atom;
(b) intimately contacting said mono-carboxylated dialumino trioctane product with a molar excess, based on aluminum, of carbon dioxide at a temperature from about 150° C. to about 220° C. and a pressure from about 1 atmosphere to about 80 atmospheres, thereby forming a di-carboxylated dialumino trioctane product of an average of two carbon dioxide molecules for each aluminum atom;
(c) intimately contacting said di-carboxylated dialumino trioctane product with molecular oxygen at a temperature from about 20° C. to about 150° C. and a pressure from about 1 atmosphere to about 6 atmospheres; and
(d) hydrolyzing the resulting product by contact with aqueous strong mineral acid at a temperature from about 30° C. to about 120° C.

References Cited

UNITED STATES PATENTS 3,070,626   12/1962   Convery _____ 260—485

ALEX MAZEL, *Primary Examiner.*

J. A. NARCAVAGE, *Assistant Examiner.*